(12) United States Patent
Endoh

(10) Patent No.: US 8,527,919 B2
(45) Date of Patent: Sep. 3, 2013

(54) DESCRIPTION REWRITING DEVICE, DESIGN DESCRIPTION REWRITING METHOD, AND COMPUTER READABLE MEDIUM

(75) Inventor: Yusuke Endoh, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1003 days.

(21) Appl. No.: 12/554,351

(22) Filed: Sep. 4, 2009

(65) Prior Publication Data

US 2010/0083214 A1 Apr. 1, 2010

(30) Foreign Application Priority Data

Sep. 26, 2008 (JP) ................................. 2008-248538

(51) Int. Cl.
*G06F 17/50* (2006.01)
(52) U.S. Cl.
USPC .......................................... 716/101; 716/104
(58) Field of Classification Search
USPC ................................................ 716/101, 104
See application file for complete search history.

(56) References Cited

U.S. PATENT DOCUMENTS 7,080,365 B2 * 7/2006 Broughton et al. ............ 717/146

FOREIGN PATENT DOCUMENTS

| JP | 2006-190085 | 7/2006 |
|---|---|---|
| JP | 2006-228221 | 8/2006 |
| JP | 2007-287088 | 11/2007 |

* cited by examiner

*Primary Examiner* — Thuan Do
(74) *Attorney, Agent, or Firm* — Ohlandt, Greeley, Ruggiero & Perle, L.L.P.

(57) ABSTRACT

There is provided with a device that includes a first inputter inputting design description which includes functions; a second inputter inputting type specifying description corresponding to the functions, each of which specifies a type for a return value of each corresponding function, and the description of at least one function of the functions specifies a type for a return value of a first function which is an other function of functions; a determiner determining a type of the return value of the first function to a comprehensive type to comprehend the types specified by the type specifying description corresponding to the first function and the at least one function and a type of the return value of a second function which is a function than the first function to the type specified thereto.

12 Claims, 9 Drawing Sheets

```
int adder(int x, int y){
   return x + y;
}
int mod_a(){
   int x;
   int y;
   x = 3;
   y = 3;
   return adder(x, y)
}
int mod_b(){
   int x
   int y;
   x = 50;
   y = 50;
   return adder(x, y)
}
```

FIG. 4

```
sc_int<4>mod_a();
sc_int<4>x, y: call(mod_a);
sc_int<8>mod_b();
sc_int<8>x, y: call(mod_b);
sc_int<4>adder(sc_int<4>, sc_int<4>): call(mod_a);
sc_int<8>adder(sc_int<8>, sc_int<8>): call(mod_b);
```

FIG. 5

| IDENTIFIER | VIEWPOINT | CORRESPONDING SYNTAX |
|---|---|---|
| mod_a | - | DEFINITION OF FUNCTION mod_a |
| x | mod_a | DECLARATION OF VARIABLE x IN FUNCTION mod_a |
| y | mod_a | DECLARATION OF VARIABLE y IN FUNCTION mod_b |
| mod_b | - | DEFINITION OF FUNCTION mod_b |
| x | mod_b | DECLARATION OF VARIABLE x IN FUNCTION mod_b |
| y | mod_b | DECLARATION OF VARIABLE y IN FUNCTION mod_b |
| adder | mod_a | DEFINITION OF FUNCTION adder |
| adder | mod_b | DEFINITION OF FUNCTION adder |

FIG. 6

| SYNTAX | : TYPE |
|---|---|
| DEFINITION OF FUNCTION mod_a | : sc_int<4>mod_a() |
| DECLARATION OF VARIABLE x IN FUNCTION mod_a | : sc_int<4>x |
| DECLARATION OF VARIABLE y IN FUNCTION mod_a | : sc_int<4>y |
| DEFINITION OF FUNCTION mod_b | : sc_int<8>mod_b() |
| DECLARATION OF VARIABLE x IN FUNCTION mod_b | : sc_int<8>x |
| DECLARATION OF VARIABLE y IN FUNCTION mod_b | : sc_int<8>y |
| DEFINITION OF FUNCTION adder | : sc_int<8>adder(sc_int<8>, sc_int<8>) |

FIG. 7

| SYNTAX | : TYPE |
|---|---|
| DEFINITION OF FUNCTION mod_a | : sc_int<4>*() |
| DECLARATION OF VARIABLE x IN FUNCTION mod_a | : sc_int<4>* |
| DECLARATION OF VARIABLE y IN FUNCTION mod_b | : sc_int<4>* |
| DEFINITION OF FUNCTION mod_b | : sc_int<8>*() |
| DECLARATION OF VARIABLE x IN FUNCTION mod_b | : sc_int<8>* |
| DECLARATION OF VARIABLE y IN FUNCTION mod_b | : sc_int<8>* |
| DEFINITION OF FUNCTION adder | : sc_int<8>*(sc_int<8>*, sc_int<8>*); |

FIG. 8

| SYNTAX | : TYPE |
|---|---|
| FUNCTION ADDER CALLED IN FUNCTION mod_a | : (sc_int<4>)adder((sc_int<8>)*, (sc_int<8>)*) |

FIG. 9

```
sc_int<8>adder(sc_int<8>x, sc_int<8>y){
  return x + y;
}
sc_int<4>mod_a(){
  sc_int<4>x;
  sc_int<4>y;
  x = 3;
  y = 3;
  return (sc_int<4>)adder((sc_int<8>)x, (sc_int<8>)y)
}
sc_int<8>mod_b(){
  sc_int<8>x
  sc_int<8>y;
  x = 50;
  y = 50;
  return adder(x, y)
}
```

FIG. 10

```
sc_int<4>mod_a();
sc_int<4>x, y: call(mod_a);
sc_int<8>mod_b();
sc_uint<8>x, y: call(mod_b);
sc_int<4>adder(sc_int<4>, sc_int<4>): call(mod_a);
sc_int<8>adder(sc_int<8>, sc_int<4>): call(mod_b);
```

FIG. 11

| DEFINITION | : USE |
|---|---|
| VARIABLE x DEFINED IN FUNCTION mod_a | : FIRST ARGUMENT OF FUNCTION adder |
| VARIABLE y DEFINED IN FUNCTION mod_a | : SECOND ARGUMENT OF FUNCTION adder |
| VARIABLE x DEFINED IN FUNCTION mod_b | : FIRST ARGUMENT OF FUNCTION adder |
| VARIABLE y DEFINED IN FUNCTION mod_b | : SECOND ARGUMENT OF FUNCTION adder |
| RETURN VALUE OF FUNCTION adder IN FUNCTION mod_a | : RETURN VALUE OF FUNCTION mod_a |
| RETURN VALUE OF FUNCTION adder IN FUNCTION mod_b | : RETURN VALUE OF FUNCTION mod_b |

FIG. 12

```
sc_int<4>mod_a();
sc_int<4>x, y: call(mod_a);
sc_int<8>mod_b();
sc_int<8>x, y: call(mod_b);
```

FIG. 13

IDENTIFIER : VIEWPOINT : CORRESPONDING SYNTAX
mod_a     : -       : DEFINITION OF FUNCTION mod_a
x         : mod_a   : DECLARATION OF VARIABLE x IN FUNCTION mod_a
y         : mod_a   : DECLARATION OF VARIABLE y IN FUNCTION mod_b
mod_b     : -       : DEFINITION OF FUNCTION mod_b
x         : mod_b   : DECLARATION OF VARIABLE x IN FUNCTION mod_b
y         : mod_b   : DECLARATION OF VARIABLE y IN FUNCTION mod_b

FIG. 14

```
foo(x, y) {
   return x + y;
}
```

FIG. 15

```
int foo(int, int);
```

FIG. 16

IDENTIFIER : VIEWPOINT : CORRESPONDING SYNTAX
foo       : -        : DEFINITION OF FUNCTION foo

FIG. 17

SYNTAX                        : TYPE
DEFINITION OF FUNCTION foo : int foo(int, int)

FIG. 18

SYNTAX                        : TYPE
DEFINITION OF FUNCTION foo : int*(int*, int*)

FIG. 19

```
int foo(int x, int y) {
   return x + y;
}
```

FIG. 20

DESCRIPTION REWRITING DEVICE, DESIGN DESCRIPTION REWRITING METHOD, AND COMPUTER READABLE MEDIUM

CROSS REFERENCE TO RELATED APPLICATIONS

This application is based upon and claims the benefit of priority from the prior Japanese Patent Application No. 2008-248538, filed on Sep. 26, 2008, the entire contents of which are incorporated herein by reference.

BACKGROUND OF THE INVENTION

1. Field of the Invention

The present invention relates to a design description rewriting device, a design description rewriting method, and a computer readable medium storing a program for performing the method to effectively rewrite design description of development software or design description of an electronic system including a digital circuit, etc. so that the effective performance of the software and the electronic system is improved.

2. Related Art

In the design description of a program and a digital circuit, when description having a high-level abstraction is made by using a general type, there is a tendency that development efficiency and maintenance efficiency are improved while the effective efficiency and quality of the execution program and the digital circuit thus generated are decreased. On the other hand, when description having a low-level abstraction is made by using a concrete type, there is a tendency that development efficiency and maintenance efficiency are decreased because of the decrease in modularity caused by the complicated description while the execution efficiency and quality of the execution program thus generated are improved. Accordingly, when the description is made by using the general type in the first design, the type must be rewritten into the concrete type subsequent to system level test etc.

As a concrete example, when the circuit description is made by using a high-level design technique, the above relationship can be applied to an integer having specified bit width and an integer having unspecified bit width. When the circuit description is made at an operation level without specifying the bit width, development efficiency is improved. However, the circuit thus generated has unnecessary wiring, by which the size of the circuit is increased and the speed of the circuit is decreased. When the circuit description is made in detail by specifying the bit width, development efficiency is decreased due to the complicated description. However, the circuit thus generated does not have unnecessary wiring, by which the size of the circuit is decreased and the speed of the circuit is improved.

As another example, the above relationship can also be applied to a software program described in a dynamically-typed style and a software program described partially or completely in a statically-typed style. In the former case, development efficiency is improved, while execution efficiency and reliability are decreased since static analysis etc. of a compiler cannot be applied. In the latter case, development efficiency is decreased, while execution efficiency and reliability can be improved by applying the static analysis.

In JP-A 2007-287088 (Kokai) and JP-A 2006-190085 (Kokai), a function to judge the bit width is used and provided. Although the disclosed device performs the judgment by analyzing the influence etc. of the type, modularity to change the type is low, by which development efficiency is not enough. Here, the modularity means a property which makes it possible to make a change based on a certain respect only by locally rewriting codes.

Further, in JP-A 2006-228221 (Kokai) which discloses a device to rewrite the type in the design description, modularity is not given to the instructions to rewrite the type, by which development efficiency is not enough.

SUMMARY OF THE INVENTION

According to an aspect of the present invention, there is provided with a design description rewriting device, comprising: a first inputter configured to input design description of software or hardware wherein the design description includes a plurality of functions;
a second inputter configured to input a set of type specifying description corresponding to the functions wherein each type specifying description specifies a type for a return value of each corresponding function, and the type specifying description of at least one function of the functions additionally specifies a type for a return value of a first function which is an other function of the functions;
a determiner configured to determine
  a type of the return value of the first function to a comprehensive type to comprehend the types specified by the type specifying description corresponding to the first function and the at least one function and
  a type of the return value of a second function which is a function than the first function out of the functions to the type specified by the type specifying description corresponding to the second function; and
a rewriter configured to rewrite the design description so that types determined by the determiner are set for the return values of the first function and the second function.

BRIEF DESCRIPTION OF THE DRAWINGS

FIG. 4 is a diagram showing an example of design description according to the first embodiment.

FIG. 5 is a diagram showing an example of a type-rewrite instruction set according to the first embodiment.

FIG. 6 is a diagram showing an example of identification result data according to the first embodiment.

FIG. 7 is a diagram showing an example of type determination result data according to the first embodiment.

FIG. 8 is a diagram showing an example of design description fractions according to the first embodiment.

FIG. 9 is a diagram showing another example of the design description fraction according to the first embodiment.

FIG. 10 is a diagram showing an example of rewritten design description according to the first embodiment.

FIG. 11 is a diagram showing an example of a type-rewrite instruction set according to the second embodiment.

FIG. 12 is a diagram showing an example of dependency relation data according to the second embodiment.

FIG. 13 is a diagram showing an example of a type-rewrite instruction set according to the third embodiment.

FIG. 14 is a diagram showing an example of identification result data according to the third embodiment.

FIG. 15 is a diagram showing an example of design description according to the fourth embodiment.

FIG. 16 is a diagram showing an example of a type-rewrite instruction according to the fourth embodiment.

FIG. 17 is a diagram showing an example of identification result data according to the fourth embodiment.

FIG. 18 is a diagram showing an example of type determination result data according to the fourth embodiment.

FIG. 19 is a diagram showing an example of a design description fraction according to the fourth embodiment.

FIG. 20 is a diagram showing an example of rewritten design description according to the fourth embodiment.

DETAILED DESCRIPTION OF THE INVENTION

Embodiments according to the present invention will now be explained with reference to the accompanying drawings.

First Embodiment

Figure 1:
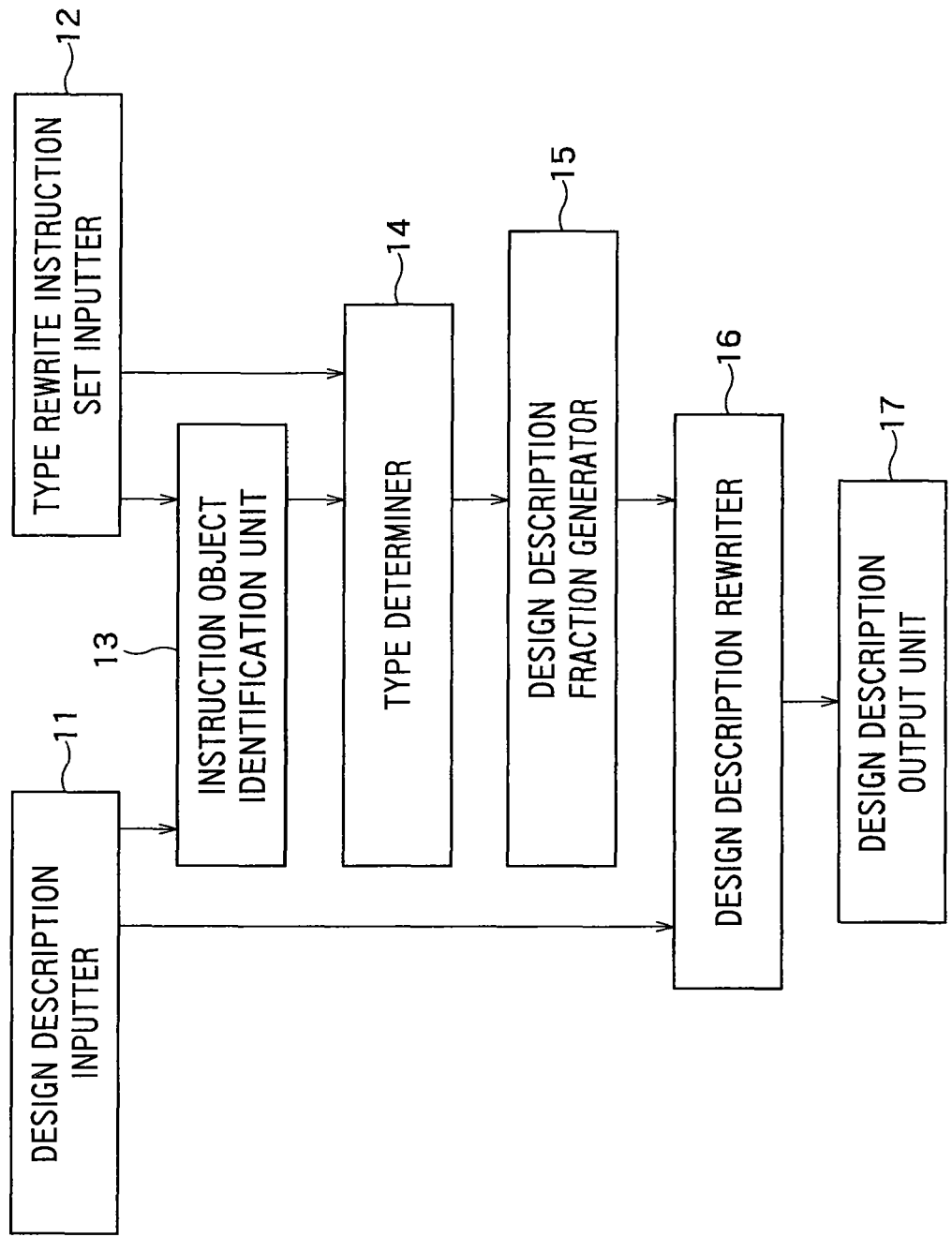
FIG. 1 is a block diagram of a design description rewriting device according to first and fourth embodiments of the present invention.

FIG. 1 is a block diagram of a design description rewriting device according to a first embodiment of the present invention.

A design description inputter (a first inputter) 11 reads design description as input from an external storage device and outputs the internal representation of the design description. The internal representation of the design description is an abstract syntax tree of the design description or the representation corresponding thereto. The design description itself can be stored as character strings or byte sequence to serve as the internal representation of the design description.

In this case, the design description inputter 11 reads the design description (circuit description) shown in FIG. 4 as input and outputs the internal representation of the design description. The design description is made in SystemC language.

The design description shown in FIG. 4 is formed of three modules, each of which is expressed as a function. That is, the design description shown in FIG. 4 is made by using functions of adder, mod_a, and mod_b.

The function adder is an adder module which is input with two values and outputs the sum of the two values. The function adder is a subroutine function called by mod_a or mod_b.

The function mod_a is a module which is input with no value and calculates the sum of 3 and 3 by using the adder to output the result.

The function mod_b is a module which is input with no value and calculates the sum of 50 and 50 by using the adder to output the result.

All of these operations are performed by using an int type (general type). The bit width of the int type differs depending on the execution environment of the description, but is often 32-bit when the environment is based on a 32-bit CPU. In this case, 32-bit width is assumed.

Figure 21:
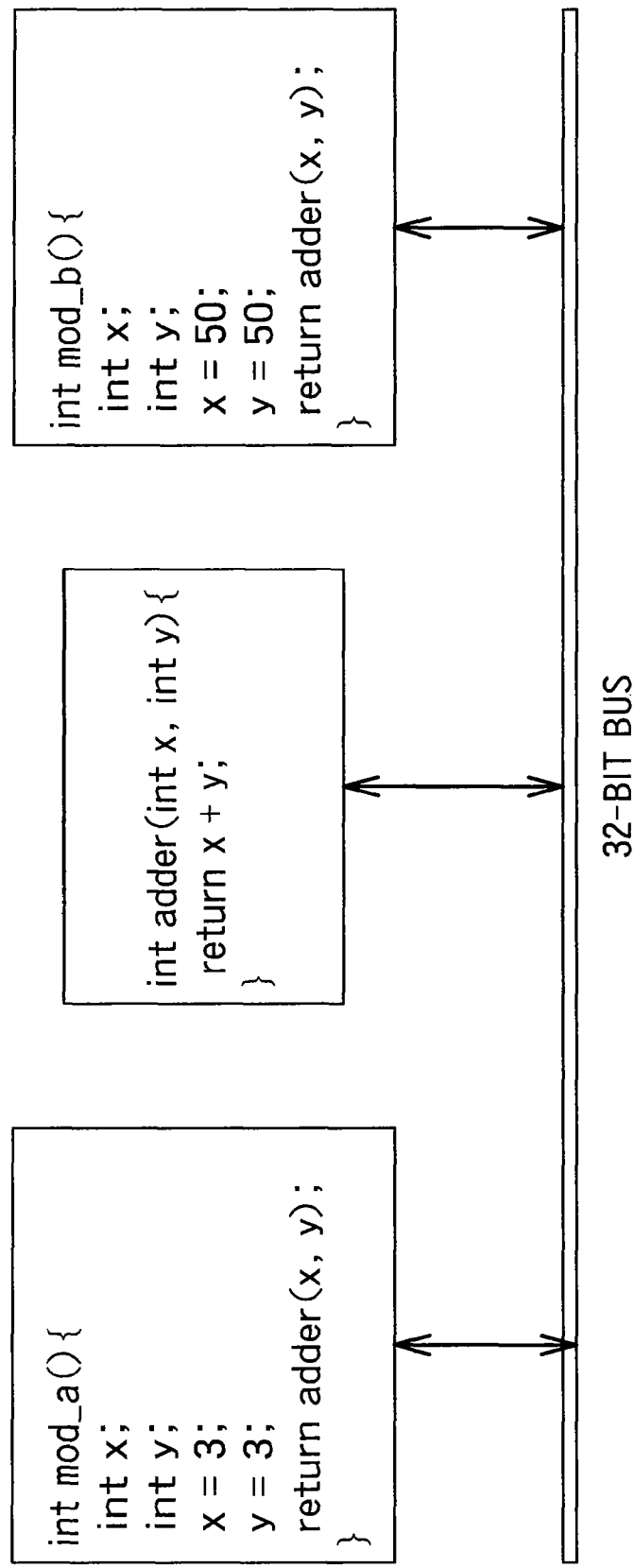
FIG. 21 is a diagram showing the relationship among modules in the design description according to the first embodiment.

FIG. 21 shows the relationship among these modules. The modules communicate one another through a bus. The bus is required to have a width of 32 bits or greater in order to transmit and receive a value of the 32-bit int type.

A type-rewrite instruction set inputter (a second inputter) 12 reads a type-rewrite instruction set as input from the external storage device and outputs the internal representation of the type-rewrite instruction set. The internal representation of the type-rewrite instruction set is memory representation into which the type-rewrite instruction set is converted in such a way that instruction information thereof is not lost.

In this case, the type-rewrite instruction set inputter 12 reads the type-rewrite instruction set shown in FIG. 5 as input and outputs the internal representation of the type-rewrite instruction set.

The type-rewrite instruction set shown in FIG. 5 includes six type-rewrite instructions.

The type-rewrite instruction is formed of a set of (1) type, (2) identifier, and (3) viewpoint. Note that the description of the viewpoint can be omitted. When the description of the viewpoint is omitted, the viewpoint is considered to be a global viewpoint. The viewpoint (local view point which is not omitted) corresponds to a function using the variable specified by the corresponding identifier or a function calling the function specified by the corresponding identifier.

The first line is a type-rewrite instruction to rewrite the type of the return value of the function mod_a into sc_int<4>. The viewpoint is omitted.

The second line is a type-rewrite instruction to rewrite the type of variables x and y into sc_int<4>. The viewpoint is the function mod_a, and the variables to be type-rewritten are limited to x and y in the function mod_a.

The third line is a type-rewrite instruction to rewrite the type of the return value of the function mod_b into sc_int<8>. The viewpoint is omitted.

The fourth line is a type-rewrite instruction to rewrite the type of variables x and y into sc_int<8>. The viewpoint is function mod_b, and the variables to be type-rewritten are limited to x and y in the function mod_b.

The fifth line is a type-rewrite instruction to rewrite the type of both arguments of the function adder into sc_int<4> and rewrite the type of the return value of the function adder into sc_int<4>. The viewpoint is the function mod_a, and the type of the arguments and the type of the return value of the function adder are viewed as sc_int<4> when the function adder is called by the function mod_a. In this case, although the description of the arguments x and y is omitted, the arguments can be described as follows: "sc_int<4> adder (sc_int<4>x, sc_int<4>y): call(mod_a)."

The sixth line is a type-rewrite instruction to rewrite the type of both arguments of the function adder into sc_int<8> and rewrite the type of the return value of the function adder into sc_int<8>. The viewpoint is the function mod_b, and the type of the arguments and the type of the return value of the function adder are viewed as sc_int<8> when the function adder is called by the function mod_b. In this case, although the description of the arguments x and y is omitted, the arguments can be described in a same way as that stated above.

In FIG. 5, among functions (that is, adder, mod_a, and mod_b), the type-rewrite instruction is given to each of the functions mod_a and mod_b, while the type-rewrite instruction is not given to the function adder.

That is, with respect to the function mod_a, the type of the return value of the function mod_a, the type of the return value of the function adder called in the function mod_a, and the type of the variables (x and y) defined in the function mod_a are specified. Further, with respect to the function mod_b, the type of the return value of the function mod_b, the type of the return value of the function adder called in the function mod_b, and the type of the variables (x and y)

defined in the function mod_b are specified. The function adder, which is called in the functions mod_a and mod_b, corresponds to a "first function" of the present invention. Each of the functions mod_a and mod_b, which is not called in any function, corresponds to a "second function" of the present invention. The type-rewrite instructions shown in FIG. 5 will be explained in detail in the following.

In FIG. 5, a type-rewrite instruction set (composed of the first, second, and fifth lines) concerning the function mod_a corresponds to "type specifying description" concerning the function mod_a in the present invention. Further, a type-rewrite instruction set (composed of the third, fourth, and sixth lines) concerning the function mod_b corresponds to "type specifying description" concerning the function mod_b in the present invention.

An instruction object identification unit 13 receives the internal representation of the design description and the internal representation of the type-rewrite instruction set and identifies, in the internal representation of the design description, syntaxes (declaration statement or definition statement) including a variable or a function specified by each identifier in the internal representation of the type-rewrite instruction set according to the viewpoint corresponding to each identifier. Then, the instruction object identification unit 13 generates identification result data by relating the specified syntax to the identifier and the viewpoint and outputs the identification result data thus generated. Note that when the declaration statement or the definition statement including the variable or the function specified is not existent, the error can be reported.

In this case, the instruction object identification unit 13 receives the internal representation of the design description shown in FIG. 4 and the internal representation of the type-rewrite instruction set shown in FIG. 5. The instruction object identification unit 13 extracts the identifier and the viewpoint (of variable and function) from the internal representation of the type-rewrite instruction set. Then, the instruction object identification unit 13 specifies the syntax (declaration statement or definition statement) including the extracted identifier in the design description according to the extracted viewpoint and relates the specified syntax to the extracted identifier and the extracted viewpoint. The identification result data shown in FIG. 6 is generated.

A type determiner (a determiner) 14 receives the internal representation of the type-rewrite instruction set and the identification result data.

When the identification result data includes a plurality of same syntaxes, the type determiner 14 specifies the type-rewrite instruction corresponding to each syntax according to its viewpoint in the internal representation of the type-rewrite instruction set. Then, a comprehensive type to comprehend the types specified by the type-rewrite instructions (for example, a broadest type selected from these types, or a broader type than the selected type) is determined to be a type of these syntaxes. An inclusive relation between the types depends on the language in which the design description is made, and when the type including these types is not existent, the error can be reported.

With respect to a syntax which is the only one in the identification result data, the type determiner 14 specifies the type-rewrite instruction corresponding to the syntax according to its viewpoint and determines the type specified by the type-rewrite instruction as a type of the syntax.

The type determiner 14 determines the type of each syntax as stated above and outputs type determination result data representing the type determined for each syntax.

In this case, the type determiner 14 receives the internal representation of the type-rewrite instruction set shown in FIG. 5 and the identification result data shown in FIG. 6. In FIG. 6, the number of syntaxes concerning "the definition of the function adder" is two. Referring to FIG. 5, the following type-rewrite instructions can be obtained to specify each set of the syntax and its viewpoint:

sc_int<4> adder(sc_int<4>, sc_int<4>): call(mod_a); and
sc_int<8> adder(sc_int<8>, sc_int<8>): call(mod_b).

Then, the type of these syntaxes is determined in accordance with "sc_int<8> adder(sc_int<8>, sc_int<8>): call(mod_b)," which indicates the broadest type (the largest bit width) in the types specified by these type-rewrite instructions. In this case, the magnitude relation (inclusive relation) between the types is determined in accordance with the type of the return value of each function.

Each of the syntaxes except "the definition of the function adder" is only one, and the type of each syntax is determined to be the type specified by the type-rewrite instruction according to its viewpoint.

As a result, the type determiner 14 outputs the type determination result data shown in FIG. 7.

The design description fraction generator 15 receives the internal representation of the type-rewrite instruction set and the type determination result data and generates and outputs design description fraction for type declaration and design description fraction for type conversion. Specifically, the method for the type declaration and the type conversion depends on the language in which the design description is made. When the conversion cannot be defined (for example, when there is no compatibility with respect to the type), the error can be reported.

In this case, the design description fraction generator 15 receives the internal representation of the type-rewrite instruction set shown in FIG. 5 and the type determination result data shown in FIG. 7.

The design description fraction generator 15 sets each identifier (the identifier of the variable or the function) to be blank in the type determination result data of FIG. 7 to generate the design description fraction. FIG. 8 shows an example of the generated design description fraction. The symbol "*" represents a blank.

Further, the design description fraction generator 15 seeks a type-rewrite instruction which specifies a type differing from (narrower than) the type determination result from the internal representation of the type-rewrite instruction set. In this case, the type-rewrite instruction "sc_int<4> adder(sc_int<4>, sc_int<4>): call(mod_a)" is found. The design description fraction generator 15 generates a design description fraction to instruct to temporarily expand the bit width (type) of the variable given to the argument before the function adder is called and reduce the bit width (type) of the return value, so that the above type-rewrite instruction is made conformed to the type of the function adder defined in the lowest line of FIG. 8 when the function adder is called in the function mod_a and so that the type of the return value of the function adder is made conformed to its destination (e.g. a variable to which the return value is pass). FIG. 9 shows the design description fraction thus generated. In "(sc_int<4>) adder((sc_int<8>)*, (sc_int<8>)*)" shown in FIG. 9, the type conversion is represented in parentheses "( )". The type conversion means expansion or reduction. As in FIG. 8, the identifier is blank.

The design description fraction generator 15 outputs the design description fractions shown in FIG. 8 and the design description fraction shown in FIG. 9 as a design description fraction set.

A design description rewriter (a rewriter) 16 receives the internal representation of the design description and the design description fraction set and rewrites the internal representation of the design description in accordance with the design description fraction set.

In this case, the design description rewriter 16 receives the internal representation of the design description shown in FIG. 4 and the design description fraction set shown in FIGS. 8 and 9. The design description rewriter 16 embeds the type specified by the design description fraction in the corresponding syntax described in the internal representation of the design description.

For example, the first "sc_int<4> *( )" in the design description fraction set is embedded in the definition of the function mod_a, by which the definition of the function mod_a becomes "sc_int<4> mod_a( ). By repeating a similar process on remaining design description fractions, the internal representation of a new design description is obtained as shown in FIG. 10.

A design description output unit 17 converts the internal representation of the design description output by the design description rewriter 16 into design description and outputs the converted design description. The output design description is stored in the external storage device, for example.

Figure 22:
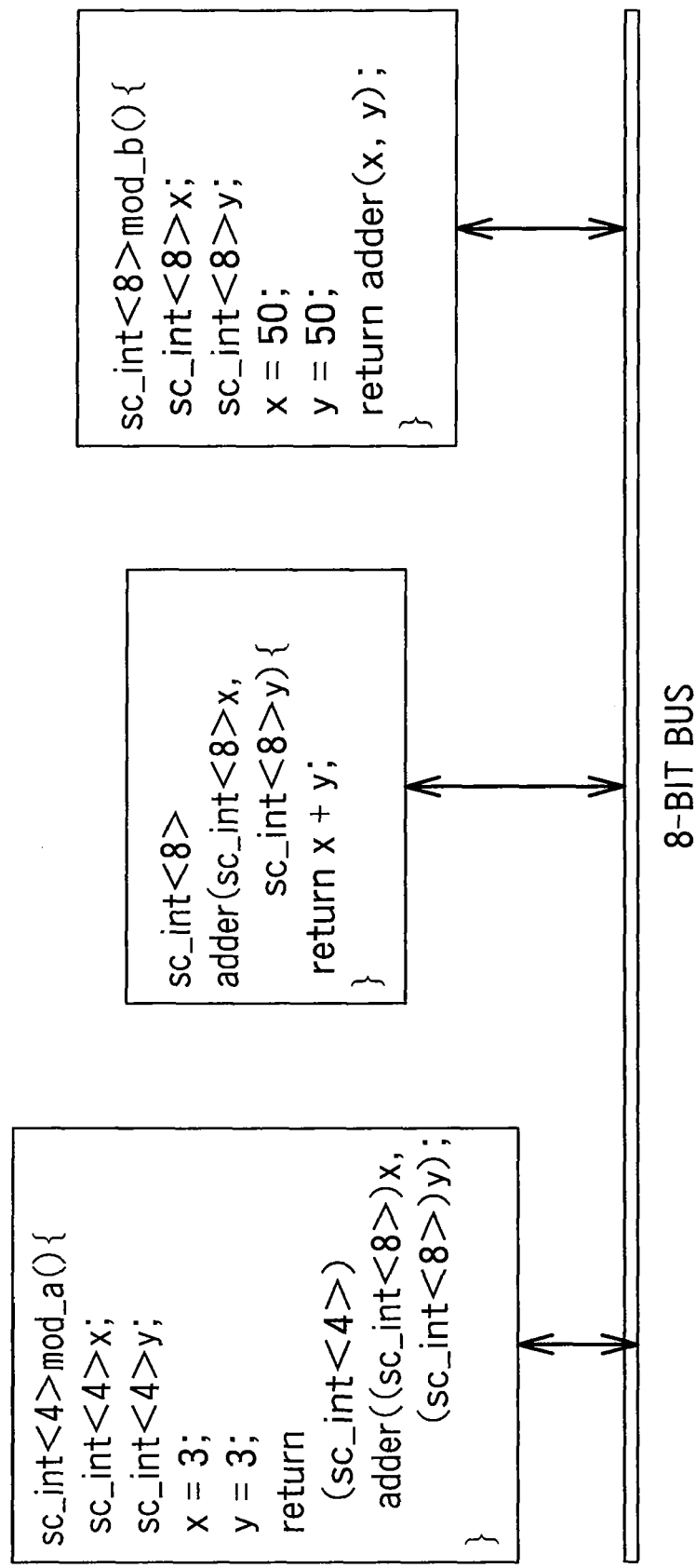
FIG. 22 is a diagram showing the relationship among modules in the rewritten design description according to the first embodiment.

In this case, the design description output unit 17 receives the internal representation of the new design description and outputs the design description shown in FIG. 10. FIG. 22 shows the relationship among the modules in the design description output from the design description output unit 17. The bus is of 8-bit width, which means unnecessary wiring can be decreased. In this way, the size of the circuit can be reduced, while the execution efficiency of the circuit can be improved.

(The Effect of the First Embodiment)

Original circuit description is made by using a general type such as an int type, by which development efficiency is improved and the development period can be shortened. In addition, the description using a concrete type such as sc_int<8> can be obtained in accordance with the instruction description in the present embodiment, which improves execution efficiency and quality of the circuit.

Conventionally, every type to be rewritten is manually sought and rewritten. On the other hand, in the present embodiment, the type can be rewritten only by giving the type rewrite instruction and executing automatic processing. Therefore, in the present embodiment, high modularity can be obtained, by which the time and effort to seek the portions to be changed and debugging work due to the bugs caused by missing the portions to be changed can be considerably decreased.

Second Embodiment

Figure 2:
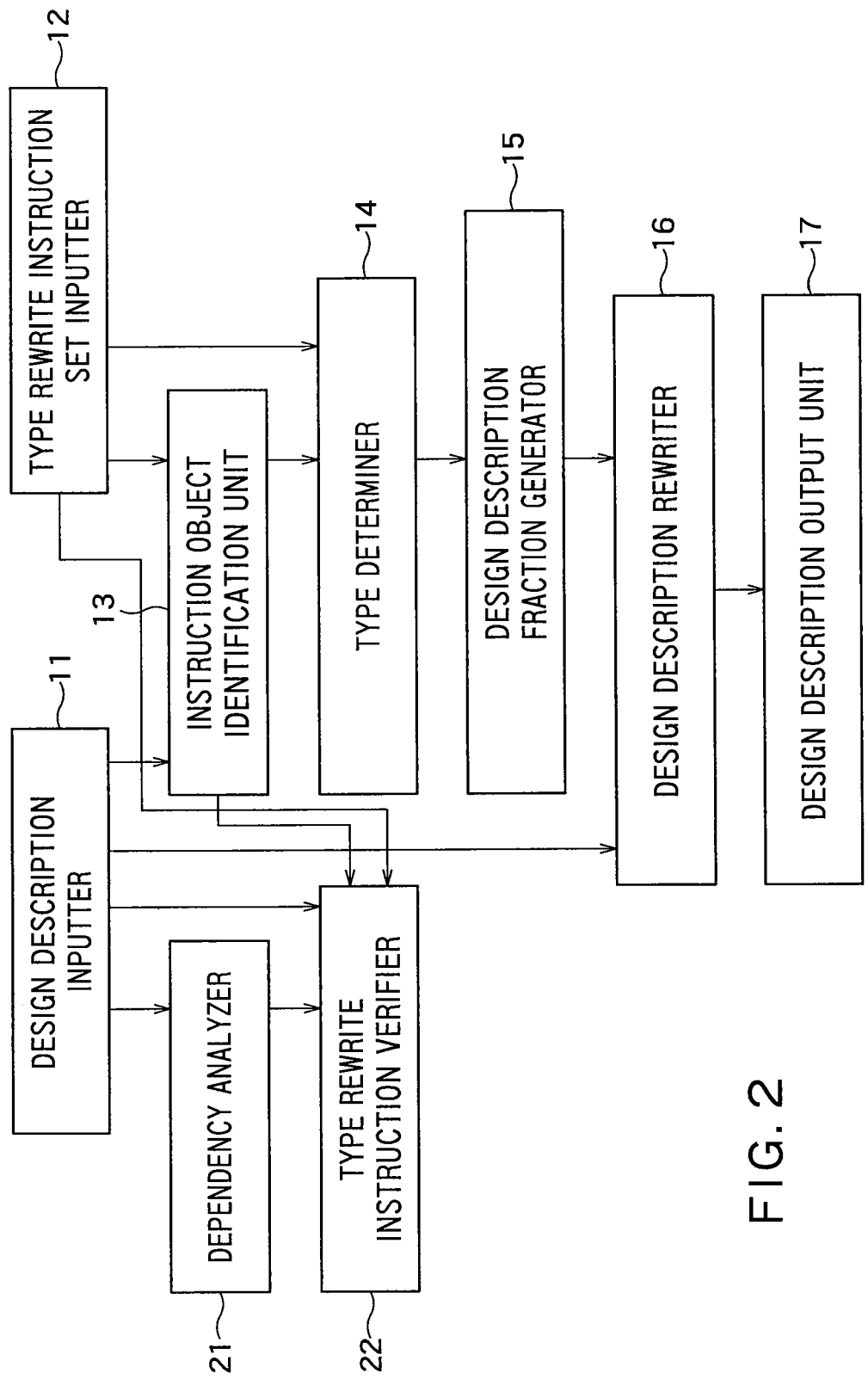
FIG. 2 is a block diagram of a design description rewriting device according to a second embodiment of the present invention.

FIG. 2 is a block diagram of a design description rewriting device according to a second embodiment of the present invention.

A dependency relation analyzer (an analyzer) 21 and a type-rewrite instruction verifier (a verifier) 22 are added to the device of FIG. 1. Hereinafter, the difference from the device of FIG. 1 will be explained.

The dependency relation analyzer 21 analyzes how the variables and the functions are used in the internal representation of the design description output from the design description inputter 11 and outputs dependency relation data. Specifically, the dependency relation analyzer 21 specifies the definitions of the variables or the functions, and specifies destinations of the variables or destinations of the return values of the functions, and outputs the relation therebetween as the dependency relation data. This analysis is performed by using a def-use analysis etc.

In this case, the dependency relation analyzer 21 receives the internal representation of the design description shown in FIG. 4 output from the design description inputter 11 and analyzes the variables or the functions and destinations thereof, and outputs the dependency relation data shown in FIG. 12. For example, the variable x defined in the function mod_a is used as a first argument of the function adder, while the return value of the function adder called in the function mod_a is used as the return value of the function mod_a.

The type-rewrite instruction verifier 22 receives the internal representation of the design description output from the design description inputter 11, the internal representation of the type-rewrite instruction set output from the type-rewrite instruction set inputter 12, the dependency relation data output from the dependency relation analyzer 21, and the identification result data output the instruction object identification unit 13 and judges whether or not the design description and the type-rewrite instruction set are consistent with each other. When the design description and the type-rewrite instruction set are not consistent with each other, the type-rewrite instruction verifier 22 reports an error showing the inconsistency, by which the efficiency of design development can be further improved.

In this case, the design description inputter 11 outputs the internal representation of the design description shown in FIG. 4, while the type-rewrite instruction set inputter 12 outputs the internal representation of the type-rewrite instruction set shown in FIG. 11. The type-rewrite instruction set shown in FIG. 11 is obtained by changing the type-rewrite instruction set of FIG. 5 in the first embodiment so that sc_int is replaced with sc_uint in the instruction given to the variables x and y from the viewpoint of the function mod_b. The types sc_int and sc_uint cannot be automatically converted therebetween (that is, sc_int and sc_uint are not compatible with each other).

The instruction object identification unit 13 operates similarly as in the first embodiment and outputs the identification result data shown in FIG. 6.

The type-rewrite instruction verifier 22 receives the internal representation of the design description shown in FIG. 4, the internal representation of the type-rewrite instruction set shown in FIG. 11, the identification result data shown in FIG. 6, and the dependency relation data shown in FIG. 12.

The type-rewrite instruction verifier 22 lists the dependency relations included in the dependency relation data in FIG. 12. Then, with respect to each dependency relation, the type-rewrite instruction verifier 22 seeks the type specified for the variable or the function, and the type specified for the destination of variable or the destination of the return value of the function, based on the identification result data and the internal representation of the type-rewrite instruction set, and verifies whether or not both types are compatible (that is, consistent) with each other. When both types are not compatible with each other (i.e. when a dependency relation lacking compatibility is found), the type-rewrite instruction verifier 22 reports the error and quit the process.

In this example, a first dependency relation shown in FIG. 12 is "the variable x defined in the function mod_a: a first argument of the function adder". Since the type of "the variable x defined in the function mod_a" is sc_:int<4> while the type of "the first argument of the function adder" is also sc_int<4> from the viewpoint of the function mod_a, these types are compatible with each other.

A second dependency relation is "the variable y defined in the function mod_a: a second argument of the function adder." Since the type of "the variable y defined in the function mod_a" is sc_int<4> while the type of "the second argument of the function adder" is also sc_int<4> from the viewpoint of the function mod_a, these types are compatible with each other.

A third dependency relation is "the variable x defined in the function mod_b: the first argument of the function adder." Since the type of "the variable x defined in the function mod_b" is sc_uint<8> while the type of "the first argument of the function adder" is sc_int<8> from the viewpoint of the function mod_b, these types are not compatible with each other. Accordingly, the error is reported and the process is quit.

(The Effect of the Second Embodiment)

In the first embodiment, there is a problem that design description having an error is output when an inconsistent type-rewrite instruction set is input. On the other hand, in the present embodiment, an error is reported when the inconsistent type-rewrite instruction set is input, which prevents the design description having an error from being output without being noticed by a user. Therefore, problems can be found in the early stage of the development processes and the number of development processes can be decreased.

Third Embodiment

Figure 3:
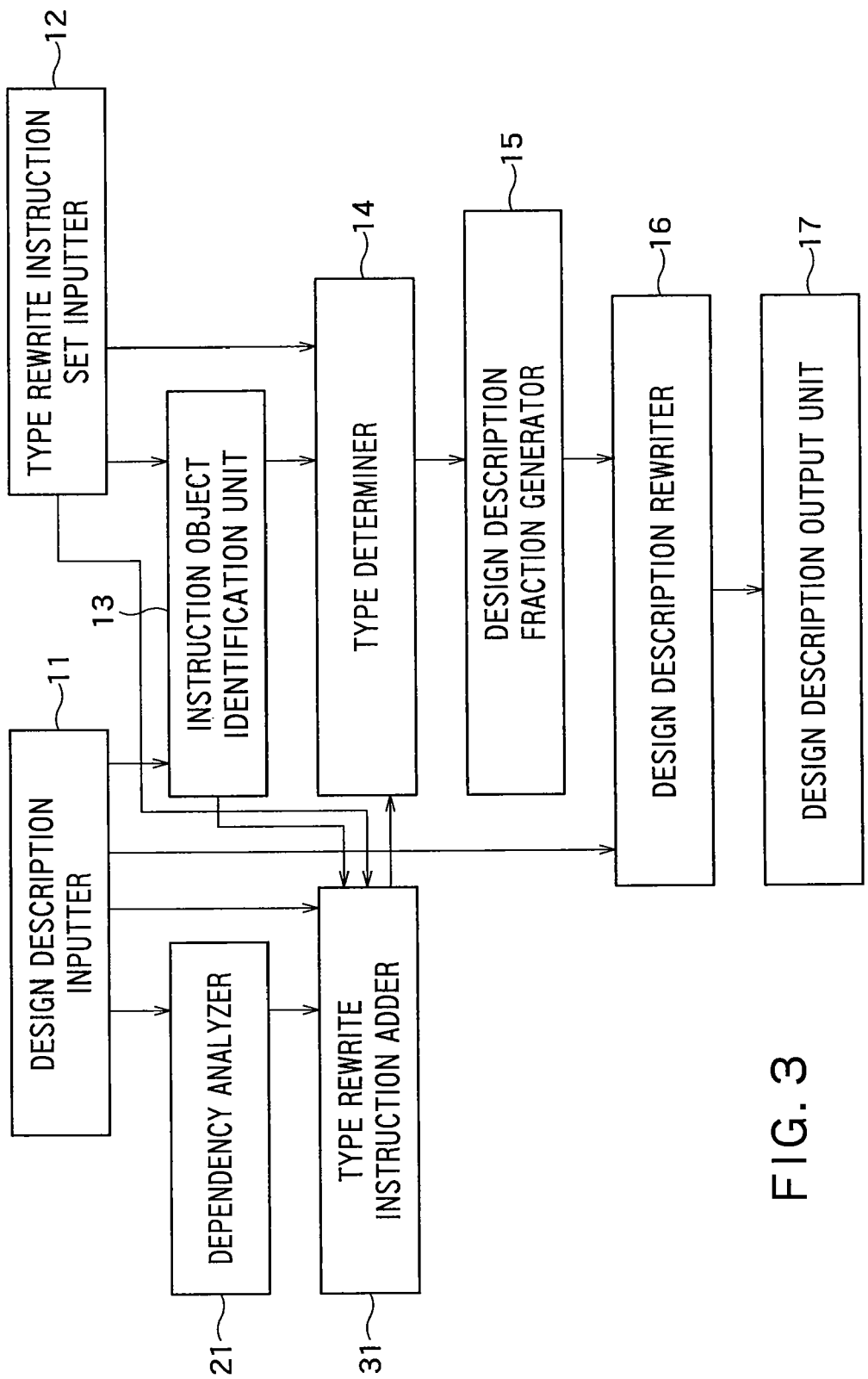
FIG. 3 is a block diagram of a design description rewriting device according to a third embodiment of the present invention.

FIG. 3 is a block diagram of a design description rewriting device according to a third embodiment of the present invention.

A dependency relation analyzer (an analyzer) 21 and a type-rewrite instruction adder 31 are added to the device of FIG. 1

Since the dependency relation analyzer 21 is similar to that in FIG. 2, the explanation thereof will be omitted.

The type-rewrite instruction adder 31 receives the internal representation of the design description output from the design description inputter 11, the internal representation of the type-rewrite instruction set output from the type-rewrite instruction set inputter 12, the identification result data output from the instruction object identification unit 13, and the dependency relation data output from the dependency relation analyzer 21, infers a type-rewrite instruction to be added to the type-rewrite instruction set, and adds the type-rewrite instruction to the type-rewrite instruction set, by which the user does not have to describe all of the type-rewrite instructions in the type-rewrite instruction set. That is, the user can omit to describe a type-rewrite instruction which can be inferred by the type-rewrite instruction adder 31, by which the efficiency of design development can be further improved.

In this case, the design description inputter 11 outputs the internal representation of the design description shown in FIG. 4, while the type-rewrite instruction set inputter 12 outputs the internal representation of the type-rewrite instruction set shown in FIG. 13. In the type-rewrite instruction set shown in FIG. 13, the instructions concerning the function adder are eliminated from the type-rewrite instruction set of FIG. 5 explained in the first embodiment.

The instruction object identification unit 13 operates similarly as in the first embodiment based on the internal representation of the design description of FIG. 4 and the internal representation of the type-rewrite instruction set of FIG. 13 and outputs the identification result data shown in FIG. 14.

The dependency relation analyzer 21 operates similarly as in the second embodiment and outputs the dependency relation data shown in FIG. 12.

The type-rewrite instruction adder 31 receives the internal representation of the design description shown in FIG. 4, the internal representation of the type-rewrite instruction set shown in FIG. 13, the identification result data shown in FIG. 14, and the dependency relation data shown in FIG. 12.

The type-rewrite instruction adder 31 lists the dependency relations included in the dependency relation data. Then, with respect to each of the listed dependency relations, the type-rewrite instruction adder 31 seeks the type specified for the defined variable or function, and the type specified for the destination of the variable or the destination of the return value of the function, based on the identification result data and the internal representation of the type-rewrite instruction set. When one type of the both types is found and the other type cannot be found, a type-rewrite instruction is added to specify the same type as the one type for the other type.

Hereinafter, this process will be concretely explained.

A first dependency relation is "the variable x defined in the function mod_a: the first argument of the function adder." The type of "the variable x defined in the function mod_a" is sc_int<4>, while the type of "the first argument of the function adder" is not specified. Accordingly, a type-rewrite instruction "* adder(sc_int<4>, *): call(mod_a)" is generated so that the type of the first argument of the function adder becomes sc_int<4> from the viewpoint of the function mod_a.

A second dependency relation is "the variable y defined in the function mod_a: the second argument of the function adder." The type of "the variable y defined in the function mod_a" is sc_int<4>, while the type of "the second argument of the function adder" is not specified. Accordingly, the type-rewrite instruction "* adder(sc_int<4>, *): call(mod_a)" is changed into "* adder(sc_int<4>, sc_int<4>): call(mod_a)" so that the type of the second argument of the function adder becomes sc_int<4> from the viewpoint of the function mod_a.

A third dependency relation is "the variable x defined in the function mod_b: the first argument of the function adder." The type of "the variable x defined in the function mod_b" is sc_int<8>, while the type of "the first argument of the function adder" is not specified. Accordingly, a type-rewrite instruction "* adder(sc_int<8>, *): call(mod_b)" is generated so that the type of the first argument of the function adder becomes sc_int<8> from the viewpoint of the function mod_b.

A fourth dependency relation is "the variable y defined in the function mod_b: the second argument of the function adder." The type of "the variable y defined in the function mod_b" is sc_int<8>, while the type of "the second argument of the function adder" is not specified. Accordingly, the type-rewrite instruction "* adder(sc_int<8>, *): call(mod_b)" is changed into "* adder(sc_int<8>, sc_int<8>): call(mod_b)" so that the type of the second argument of the function adder becomes sc_int<8> from the viewpoint of the function mod_b.

A fifth dependency relation is "the return value of the function adder in the function mod_a: the return value of the function mod_a." The type of "the return value of the function adder in the function mod_a" is not specified, while the type of "the return value of the function mod_a" is sc_int<4>. Accordingly, the type-rewrite instruction "* adder(sc_int<4>, sc_int<4>): call(mod_a)" is changed into "sc_int<4> adder(sc_int<4>, sc_int<4>): call(mod_a)" so that the type of the return value of the function mod_a becomes sc_int<4> from the viewpoint of the function mod_a.

A sixth dependency relation is "the return value of the function adder in the function mod_b: the return value of the function mod_b." The type of "the return value of the function adder in the function mod_b" is not specified, while the type of "the return value of the function mod_b" is sc_int<8>. Accordingly, the type-rewrite instruction "* adder (sc_int<8>, sc_int<8>): call(mod_b)" is changed into "sc_int<8> adder(sc_int<8>, sc_int<8>): call(mod_b)" so that the return value of the function mod_b becomes sc_int<8> from the viewpoint of the function mod_b.

Finally, new type-rewrite instructions "sc_int<4> adder (sc_int<4>, sc_int<4>): call(mod_a)" and "sc_int<8> adder (sc_int<8>, sc_int<8>): call(mod_b)" are obtained and are output in addition to the type-rewrite instruction set shown in FIG. 13. The type-rewrite instruction set to be output is completely the same as that shown in FIG. 5.

Accordingly, the rest of the operations in the present embodiment (the operations of the type determiner 14, the design description fraction generator 15, the design description rewriter 16, and the design description output unit 17) are completely the same as those in the example shown in the first embodiment.

(The Effect of the Third Embodiment)

In the first embodiment, a type-rewrite instruction which can be inferred from the other type-rewrite instructions must be specifically described. On the other hand, in the present embodiment, the type-rewrite instruction which can be inferred from the other type-rewrite instructions is automatically derived and is added to the type-rewrite instruction set, by which the user does not have to prepare every redundant type-rewrite instruction and development processes can be decreased.

Fourth Embodiment

The examples shown in the first to third embodiments are intended for the design description of an electronic system including an electronic circuit. On the other hand, the present embodiment shows an example of the design description intended for software (program). The block diagram in the present embodiment is the same as that of FIG. 1. Therefore, hereinafter, the present embodiment will be explained referring to FIG. 1.

The design description inputter 11 outputs the internal representation of the design description shown in FIG. 15. The design description describes a function "foo". The type of the argument and return value is not specified, and the only assumption required is to execute an addition operator "+." It can be considered that the type of the argument and return value is specified as a general type (object type). In the language in FIG. 15, it is considered that the meaning of the addition operator dynamically changes depending on the type of the argument. For example, the sum of two integers are calculated when the two integers are received as the arguments. On the other hand, a combined character string is calculated when character strings are received.

The type-rewrite instruction set inputter 12 outputs the internal representation of the type-rewrite instruction set shown in FIG. 16. This type-rewrite instruction is to replace the type of the function foo into "int foo(int, int)".

The instruction object identification unit 13 receives the internal representation of the design description shown in FIG. 15 and the internal representation of the type-rewrite instruction set shown in FIG. 16 and extracts the identifiers of the variable and the function and its viewpoint from the internal representation of the type-rewrite instruction set. Then, the instruction object identification unit 13 specifies the syntax (declaration statement or definition statement) including the identifier in the design description and relates the specified syntax to the identifier and the viewpoint. In this way, the instruction object identification unit 13 generates the identification result data shown in FIG. 17. In this case, the viewpoint is omitted. The instruction object identification unit 13 outputs this identification result data.

The type determiner 14 receives the internal representation of the type-rewrite instruction set shown in FIG. 16 and the identification result data shown in FIG. 17. The identification result data includes only one syntax, and a type-rewrite instruction corresponding to a set of the syntax and its viewpoint is specified from the internal representation of the type-rewrite instruction set of FIG. 16. In this case, the only type-rewrite instruction shown in FIG. 16 is specified. Then, the type determiner 14 determines the type specified by the type-rewrite instruction as a type of the syntax, by which the type determination result data shown in FIG. 18 is output.

The design description fraction generator 15 receives the internal representation of the type-rewrite instruction set shown in FIG. 16 and the type determination result data shown in FIG. 18. In the type determination result data, the identifier is set blank to generate the design description fraction. FIG. 19 shows an example of the generated design description fraction. The symbol * represents a blank.

Further, the design description fraction generator 15 seeks the type-rewrite instruction specifying a type which is different from the type determination result, in the internal representation of the type-rewrite instruction set. In the present embodiment, since such a instruction is not existent, the operation of the design description fraction generator 15 is quit.

The design description rewriter 16 receives the internal representation of the design description shown in FIG. 15 and the design description fraction shown in FIG. 19. The design description rewriter 16 embeds the type specified by the design description fraction in the corresponding syntax in the internal representation of the design description. In the design description fraction shown in FIG. 19, "int *(int *, int *)" is embedded in the definition of the function foo, by which the definition of the function foo becomes "int foo(int x, int Y)."

Accordingly, the internal representation of a new the design description shown in FIG. 20 is obtained. The design description rewriter 16 outputs the internal representation of this new the design description.

The design description output unit 17 receives the internal representation of the design description shown in FIG. 20 and outputs the design description shown in FIG. 20.

(The Effect of the Fourth Embodiment)

In a program which is in a prototype stage or a program requiring the flexibility of types, when the meaning of the operator is dynamically changed depending on the type of the argument, development efficiency is improved and a development period can be shortened. On the other hand, in a program having a limitation of types, it is not necessary to dynamically examine the type of the argument, by which the program can be executed at high speed. In the present embodiment, it is possible to make the description by using a general type in the first level to increase development efficiency, and to subsequently specify the type only for the portions requiring execution efficiency. Accordingly, the development period can be shortened and the quality can be improved at the same time.

The design description rewriting device of this embodiment may also be realized using a general-purpose computer device as basic hardware. That is, the design description inputter, type rewrite instruction set inputter, instruction object identification unit, type determiner, design description fraction generator, design description rewriter, design description output unit, dependency analyzer, type rewrite instruction verifier and type rewrite instruction adder can be realized by causing a processor mounted in the above described computer device to execute a program. In this case, the design description rewriting device may be realized by installing the above described program in the computer device beforehand or may be realized by storing the program in a storage medium such as a CD-ROM or distributing the above described program over a network and installing this program in the computer device as appropriate.

What is claimed is:

1. A design description rewriting device, comprising:
   a first inputter configured to input design description of software or hardware wherein the design description includes a plurality of functions being program modules, and at least one function of the functions calls a first function of the functions;
   a second inputter configured to input a set of type specifying description for the functions wherein the type specifying description specifies a type for a return value of each function and specifies, in view of each of the at least one function, a type for a return value of the first function called in each of the at least one function;
   a determiner configured to
      unify a type of a return value of the first function to a comprehensive type of the types of a return value of a first function specified in view of the at least one function and
      determine a type of the return value of each of second functions which is functions than the first function out of the functions to the type specified by the type specifying description; and
   a rewriter configured to rewrite the design description by inserting a type-rewrite instruction to instruct the comprehensive type as a type of the return value of the first function and type-rewrite instructions to instruct types determined by the determiner as types of the return values of the second functions.

2. The device according to claim 1, wherein the comprehensive type is a broadest type among the types of a return value of the first function specified in view of the at least one function.

3. The device according to claim 1, wherein when the type specified in view of one of the at least one function is narrower than the comprehensive type, the rewriter rewrites the design description so that when the first function is called in the one of the at least one function, a type for the return value of the called first function is temporarily converted from the comprehensive type to the type specified in view of the one of the at least one function.

4. The device according to claim 3,
   wherein the first function has an argument, the at least one function is plural, the plural functions each declares a variable, and the variable is passed to the argument in the first function when the first function is called in each of the plural functions,
   the type specifying description specifies a type of the variable in view of each of the plural functions,
   the determiner determines a type of the argument to a broadest type among types specified in view of the plural functions and determines a type of the variable declared in each of the plural functions to the type specified by the type specifying description, and
   the rewriter rewrites the design description by inserting type-rewrite instructions to instruct the broadest type and the type determined by the determiner for the argument and the variable declared in each of the plural functions, and when the type of the variable declared in one of the plural functions is narrower than the broadest type, by inserting a type-rewrite instruction to instruct to broaden the type of the variable declared therein to the broadest type when the first function is called in the one of the plural functions and the variable is passed to the argument.

5. The device according to claim 1, further comprising an analyzer and a verifier,
   wherein the functions declares variables, respectively,
   the type specifying description specify types of the variables declared in the functions, respectively,
   the analyzer analyzes the design description to find destinations of the variables declared in the functions and a destination of the return value of the first function when the first function is called in the at least one function,
   wherein the verifier verifies whether or not the types of the variables declared in the functions and the type of the return value of the first function are compatible with types of respective founded destinations, and outputs error information when compatibility is not achieved.

6. The device according to claim 1, further comprising an analyzer and a rewriter,
   wherein the functions declare variables, respectively,
   the type specifying description specify types of the variables declared in the functions, respectively,
   the analyzer analyzes the design description to find destinations of the variables declared in the functions and a destination of the return value of the first function when the first function is called in the at least one function,
   the rewriter rewrites the type specifying description by inserting, when the type of one variable of the variables is specified and a type of the destination of the one variable is not specified, a type-rewrite instruction to instruct same type as that of the one variable for the destination of the one variable, or inversely when a type of the one variable is not specified and the type of the destination of the one variable is specified, by inserting a type-rewrite instruction to instruct same type as that of the destination for the one variable, and when a type of the destination of the return value of the first function is not specified, by inserting a type-rewrite instruction to instruct same type as that of the return value for the destination,
   the determiner determines types of the variables, types of the destinations thereof and a type of the destination of the return value according to the type specifying description rewritten by the rewriter, and
   the rewriter rewrites the design description so that the types determined by the determiner are set for the variables, the destinations thereof and the destination of the return.

7. The device according to claim 1, wherein the design description is a design description of an electronic system including a digital circuit, and
   the type represents a bit width.

8. The method according to claim 1, wherein a general type is previously set to the plurality of functions in the design description and the step of the rewriting rewrites the general type of the functions to the comprehensive type for the first function and the types for the second functions determined by the step of the determining by inserting the type-rewrite instructions.

9. A computer-implemented design description rewriting method, comprising:

inputting design description of software or hardware wherein the design description includes a plurality of functions being program modules, and at least one function of the functions calls a first function of the functions;

inputting a set of type specifying description for the functions wherein the type specifying description specifies a type for a return value of each function, and specifies, in view of each of the at least one function, a type for a return value of the first function called in each of the at least one function;

unifying a type of a return value of the first function to a comprehensive type of the types of a return value of a first function specified in view of the at least one function and determining a type of the return value of each of second functions which is functions than the first function out of the functions to the type specified by the type specifying description; and rewriting the design description by inserting a type-rewrite instruction to instruct the comprehensive type as a type of the return value of the first function and type-rewrite instructions to instruct types determined by the determiner as types of the return values of the second functions.

10. The device according to claim 9, wherein a general type is previously set to the plurality of functions in the design description and the rewriter rewrites the general type of the functions to the comprehensive type for the first function and the types for the second functions determined by the determiner by inserting the type-rewrite instructions.

11. A non-transitory computer-readable medium storing a computer program that causes a computer to execute the steps of:

inputting design description of software or hardware wherein the design description includes a plurality of functions being program modules, and at least one function of the functions calls a first function of the functions;

inputting a set of type specifying description for the functions wherein the type specifying description specifies a type for a return value of each function, and specifies, in view of each of the at least one function, a type for a return value of the first function called in each of the at least one function;

unifying a type of a return value of the first function to a comprehensive type of the types of a return value of a first function specified in view of the at least one function and determining a type of the return value of each of second functions which is functions than the first function out of the functions to the type specified by the type specifying description; and rewriting the design description by inserting a type-rewrite instruction to instruct the comprehensive type as a type of the return value of the first function and type-rewrite instructions to instruct types determined by the determiner as types of the return values of the second functions.

12. The medium according to claim 11, wherein a general type is previously set to the plurality of functions in the design description and the step of the rewriting rewrites the general type of the functions to the comprehensive type for the first function and the types for the second functions determined by the step of the determining by inserting the type-rewrite instructions.

* * * * *